Feb. 12, 1924.
A. MARKER
HIDE STRETCHER
Filed April 19, 1923
1,483,822
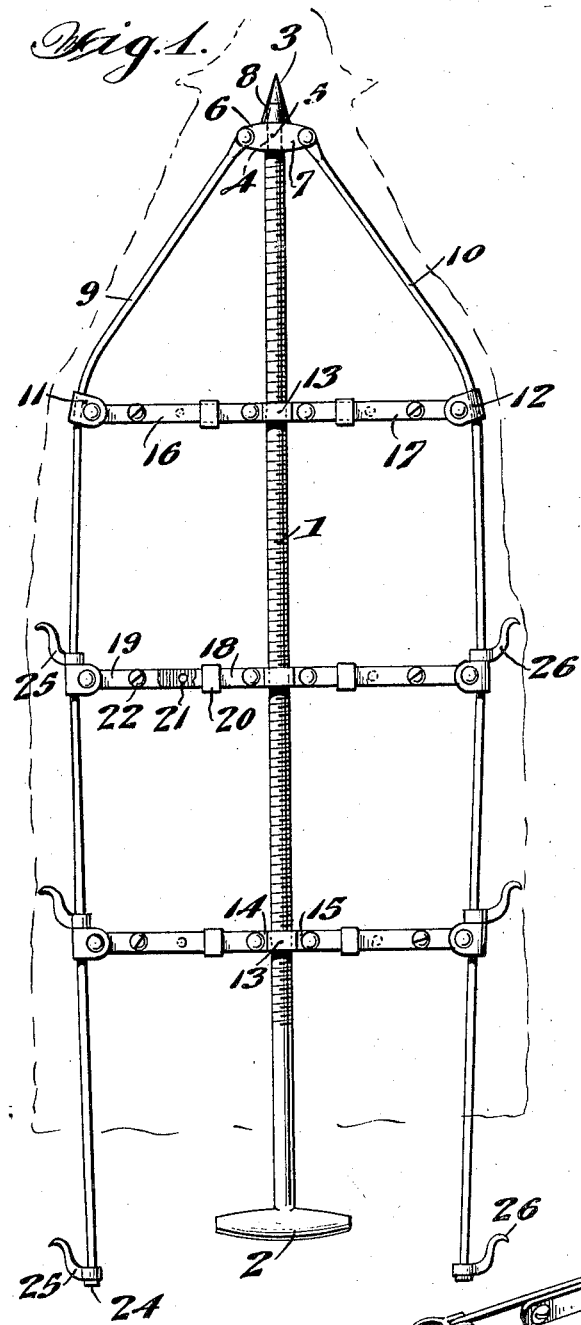
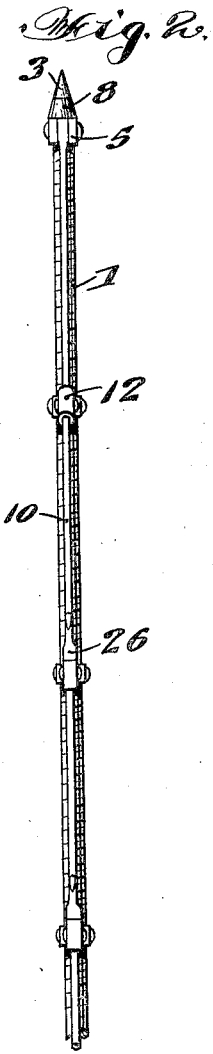
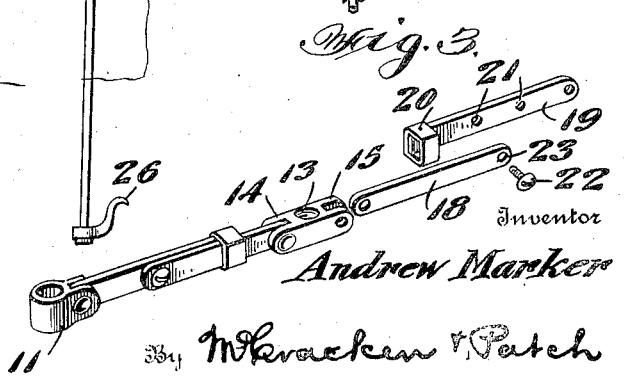
Inventor
Andrew Marker
By McCracken & Patch
his Attorneys Patented Feb. 12, 1924.

1,483,822

UNITED STATES PATENT OFFICE.

ANDREW MARKER, OF BOISE, IDAHO.

HIDE STRETCHER.

Application filed April 19, 1923. Serial No. 633,263.

*To all whom it may concern:*

Be it known that I, ANDREW MARKER, a citizen of the United States, residing at Boise, in the county of Ada and State of Idaho, have invented certain new and useful Improvements in Hide Stretchers, of which the following is a specification.

This invention relates to an improvement in hide stretchers, and particularly to a device of this character intended and adapted for use in stretching the hides or pelts of small mammals and holding the same in shape while drying.

An object of my invention is to provide a device of this character which can be used for various characters and sizes of hides or pelts, and which is so constructed that it will adjust and conform to the shape of the pelt.

A further object resides in so constructing and mounting the stretching or spreading portions that these may be manually adjusted for various sizes of hides or pelts.

Another object lies in providing means to retain the hide or pelt upon the stretcher and to prevent the same rolling or slipping at its edge.

With the above and other objects in view, which will be apparent to those skilled in the art, my invention includes certain novel features of construction and combination of parts which will now be set forth.

In the drawing,

Figure 1 is a view in elevation of my improved structure, with the parts extended to the hide stretching position and a hide indicated by dotted lines.

Fig. 2 is a view in edge elevation.

Fig. 3 is a detail perspective view to better show the construction and adjustable mounting of the spreader bars.

The spreader structure is constructed upon a central rod 1, which is provided with a handle 2 at one end, and is screw-threaded upon the other end and substantially throughout its length. The threaded end of the central rod 1 is made of conical pointed form, and the diameter of this end is slightly reduced to provide a bearing, as indicated by the dotted lines at 4, this reduced portion being threaded adjacent the point 3.

A bearing yoke 5 is fitted revolubly on the bearing portion 4 of the rod 1, and has bearing ears 6 and 7, of bifurcated form, on opposite sides. A nut 8 is fitted on the threads of the reduced portion of the rod to hold this bearing yoke against removal, this nut being preferably shaped on its outer side to continue the conical form of the point 3.

A pair of side bows 9 and 10, of wire or other suitable spring material, are pivoted in the bearing ears 6 and 7 with their free ends extending on opposite sides of the central rod 1, and these side bows have bearing clips 11 and 12 secured thereon at spaced intervals throughout their middle portions, these bearing clips being provided with bifurcated bearing eyes. Threaded sleeves 13, having the laterally extending oppositely disposed bearing ears 14 and 15, are turned onto the threaded portion of rod 1 and are spaced to correspond substantially with the spacing of the bearing clips 11 and 12 along the length of the side bows 9 and 10. Adjustable spreader bars 16 and 17 are connected in the bearing gears of the sleeves 13 and of the bearing clips 11 and 12, respectively, and it will thus be seen that as the central rod 1 is turned through manipulation of handle 2 and the threaded sleeves 13 are carried along the length of this rod, the side bows 9 and 10 will be drawn toward or expanded from the central rod.

While this adjustment and expansion of the side bows, through manipulation of central rod 1, will be sufficient to properly spread and stretch a pelt, it is desirable that spreader bars 16 and 17 be made adjustable to permit use of the device with the various sizes of hides or pelts. With this in mind, I construct each of the spreader bars of the two-bar or link members 18 and 19. The member 19 has a loop 20 which fits over and slides upon member 18, and this member 19 is provided with a plurality of threaded openings 21 to receive the screw 22 which passes through an opening 23 in the free end of the member 18. With this construction it is possible to secure several adjustments in the length of the spreader bars and as the side bows 9 and 10 will flex within reasonable limits, the spreader can be used for quite a wide range of sizes and characters of pelts.

The ends of the side bows 9 and 10 are free beyond the last bearing clips 12, and these free ends are provided with heads 24. Hooks 25 and 26 are slidably mounted on the free ends of the side bows 9 and 10, and on those portions of the bows between the bearing clips 11 and 12, these hooks having their bill ends faced in the direction of the handle end of the central rod 1.

In the use of my improved stretcher, the hide or pelt is drawn over the device with the fur side in and with the head end of the pelt at the small end of the structure. The two hooks 25 and 26 nearest the edge of the hide are then caught into the hide to prevent rolling or peeling back when the hide is stretched. The handle is then turned to move the threaded sleeve along the length of the rod to straighten out the spreader bars 16 and 17, and the side bows 9 and 10 are forced out to stretch the hide or pelt, these bows flexing to conform to the shape of the hide and thus stretching the same uniformly in all parts. The point 3 holds within the head of the pelt and hooks 25 and 26 hold adjacent the outer edge, thus insuring that the pelt or hide will be retained in the proper position while being stretched and dried.

It is preferable that the various portions of the stretcher be made of non-corrodible metal, such as brass, and it is essential that the side bows 9 and 10 be of a material which will flex for the different adjustments and which possesses sufficient resiliency to give and conform to irregularities in the shape of the hide or pelt to thus prevent tearing it.

While I have herein shown and described only certain specific constructions and mountings of the parts, it will be appreciated that changes can be made in the mechanical construction and in the form and arrangement of the parts without departing from the spirit and scope of my invention.

I claim:

1. A hide stretcher comprising a central rod having a handle at one end and provided with a bearing at the remaining end, said rod being screw-threaded throughout the greater portion of its length, a bearing yoke mounted and held upon the bearing end of the rod, side bows of resilient material connected pivotally with said bearing yoke, bearing clips mounted on said side bows at spaced intervals, threaded sleeves turned onto the central rod and spaced substantially to correspond with the spacing of the bearing clips, and adjustable spreader bars connected from said bearing clips to the threaded sleeves.

2. A hide stretcher comprising a central rod having a handle at one end and provided with a bearing at the remaining end, said rod being screw-threaded throughout the greater portion of its length, a bearing yoke mounted and held upon the bearing end of the rod, side bows of resilient material connected pivotally with said bearing yoke, bearing clips mounted on said side bows at spaced intervals, threaded sleeves turned onto the central rod and spaced substantially to correspond with the spacing of the bearing clips, adjustable spreader bars connected from said bearing clips to the threaded sleeves, said central rod being sharpened at its bearing end to hold within the head portion of a pelt, and hooks mounted on the side bows to catch within the pelt at its edges to hold the pelt against slipping or rolling while being stretched.

In testimony whereof I affix my signature.

ANDREW MARKER.